United States Patent Office 3,494,929
Patented Feb. 10, 1970

3,494,929
1-KETO OCTAHYDROQUINOLIZINE-
4-CARBOXYLIC ACIDS
Meier E. Freed, Philadelphia, Pa., assignor to American
Home Products Corporation, New York, N.Y., a corporation of Delaware
No Drawing. Filed July 25, 1967, Ser. No. 655,753
Int. Cl. C07d 39/12, 57/04
U.S. Cl. 260—294          7 Claims

ABSTRACT OF THE DISCLOSURE

The compounds of the class of 1-keto-octahydroquinolizine-4-carboxylic acids having anti-immune activity.

BACKGROUND OF THE INVENTION

The invention relates to the field of new pharmacologically active 1-keto-octahydroquinolizine-4-carboxylic acids having anti-immune activity, novel processes for their preparation and intermediates thereof.

In Japanese Patent No. 21855/64 of A. Yoshio there is disclosed the preparation of 7-alkyl-quinolizine-4-carboxylic acids and the alkaloid deoxynupharidine.

The immune response, production of antibodies, is the means by which immunity to infectious disease is generated and is an expression of the animal body's biochemical integrity. Malfunctions of this natural defense mechanism are known collectively as the immunopathies. These are characterized by altered response to external antigens, i.e., the manifestation of atopy or an allergy. They also include auto-immune phenomena. The body is normally tolerant to its own tissues and does not treat them as antigens (foreign substances). A breakdown of this tolerance (neutral homeostatic mechanisms) is the basis of those pathologic entities grouped under the term, auto-immune diseases. In addition to the immunopathies, normal functioning of the immune system can be disadvantageous for example by causing rejection of transplanted tissues or organs. Obviously, suppression of the immune response can be of major therapeutic importance in particular instances.

Suppression of the immune response was initially observed after X-ray and cortisone treatment, and can now be achieved by certain of the agents initially developed for use in cancer chemotherapy. In addition to the corticosteroids, these compounds can be divided into three major classifications, the alkylating agents (nitrogen mustards) purine antimetabolites (6-mercaptopurine) and the folic acid antagonists (methotrexate). Remarkable success in the treatment of non-neoplastic (auto-immune) diseases, and prolongation of homografts with these antineoplastic agents has stimulated research into this area of increasing interest and practical importance. Specific auto-immune diseases treated with antimetabolites include systemic lupus erthematosus, thyroiditis, polyradiculoneuropathy, forms of male sterility, immuno-allergic lung purpura, psoriasis, nephrosis, hepatitis, rheumatoid arthritis, auto-immune hemolytic anemia, idiopathic thrombocytopenic purpura, erythema nodosum, periarteritis nodosa, idiopathic plasmocytosis, atopic dermatitis, systemic scleroderma, sarcoidosis, amyloidosis, myasthenia gravis, multiple sclerosis and other demyelinating diseases of the central nervous system including diffuse scleroderma heart disease, Sjogren's syndrome, ulcerative colitis, sympathetic ophthalmia, uveitis, Addison's disease, pernicious anemia, polymyositis and dermatomyositis. Additionally, reports of auto-immune phenomena have been found associated with leprosy, tuberculosis and other infectious diseases. As a practical goal in the treatment of these immunologic diseases and in prolonging homograft survival, the possibility of selectively suppressing the immune response of an adult animal to a specific antigen is clearly of major importance.

Unfortunately, of the heretofore known group of compounds referred to above as having the desirable anti-immune activity; the alkylating agents are known to be carcinogenic and mutagenic, while the purine analogues are potentially so since they are incorporated into DNA. Further, the toxicity of the folic acid antagonists and corticosteroids are well known.

SUMMARY OF THE INVENTION

More particularly, this invention is directed to compounds of the formula:

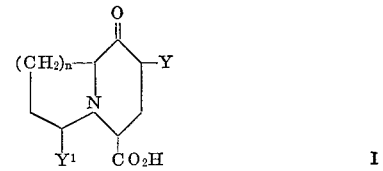

wherein $n$ is an integer less than three; and Y and $Y^1$ are each selected from the group consisting of hydrogen and lower alkyl.

The term "lower alkyl" is meant to include both the branched and straight chained radicals having less than eight carbon atoms (e.g., methyl, ethyl, propyl, isobutyl and the like).

It is well known that agents which are effective in human auto-immune diseases are active also in preventing both the clinical and histopathologic changes which occur in experimental allergic encephalomyelitis (EAE). Such agents include the compounds thioguanine, Imuran, 6-mercaptopurine, cyclophosphamide, methotrexate and cortisone, all of which have been shown to be active in human immunopathies. Thus, the diseases EAE may serve as a test standard, not only for some demyelinating diseases, more notably multiple sclerosis, but for auto-immune processes in general. (c.f. N.W. Brandriss, J. W. Smith, R. N. Friedman, "Suppression of Allergic Encephalomyelitis by Antimetabolites," Ann. N.Y. Acad. Sci., 122: 356, 1965.)

EAE is characterized by a delated (cellular) hypersensitivity which is tissue specific and results in clinical paralysis of the animal. Histopathological lesions of the spinal cord and brain caused by said disease resemble those in human demyelinating disease, and it is thus classified as an experimental auto-allergic or auto-immune disease. (c.f. B. H. Waksman, "Experimental Allergic Encephalomyelitis and the 'Auto-Allergic' Diseases," I. Arch. Allerg. appl Immundol., 14 (suppl) 1, 1959; and I. R. Mackay and F. M. Burnet, "Auto-Immune Diseases, Pathogenesis, Chemistry and Therapy," Charles C. Thomas, Springfield 1963).

The compounds of Formula I have been found to be effective in the treatment of EAE thereby clearly indicating that they are extremely active, relatively non-toxic, long-acting immunosuppressive agents. On such basis, it has been found that when compared to the standard compounds known to the art, said compounds of Formula I have been found to be effective, both in the treatment of the chronic immunologic diseases mentioned previously, and in organ and tissue transplantation. Moreover, in the use of the specified compounds of Formula I in the method of the invention, it has been found that said compounds are not incorporated into proteins. Further, their long duration of action has indicated that only relatively low and infrequent dose schedules are required to obtain therapeutic effectiveness.

In the exercising of the method of the invention, the compounds of Formula I used therein may be administered alone or in combination with pharmaceutically acceptable carriers, the proportion of which is determined by the solubility and chemical nature of the compound selected, the chosen route of administration, and standard pharmaceutical practice. For example, they may be administered orally in the form of tablets or capsules, which may contain conventional excipients, or in the form of solutions; or they may be injected parenterally, that is intramuscularly, intravenously or subcutaneously. For parenteral administration, they may be used in the form of sterile solutions containing other solutes, for example, enough saline or glucose to make the solutions isotonic.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 2.0 mg. to about 20.0 mg. per kg. of body weight per day, although as aforementioned, variations will occur. However, a dosage level that is in the range of from about 2.0 mg. to about 20.00 mg. per kg. of body weight per day is most desirably employed in order to achieve the effective results.

DESCRIPTION OF THE PREFERRED EMBODIMENTS

The compounds of this invention may be prepared according to the process of this invention which may be represented by the following reaction scheme wherein $n$, and $Y^1$ are as hereinbefore defined and $Y^{11}$ and $Z$ are alkyl:

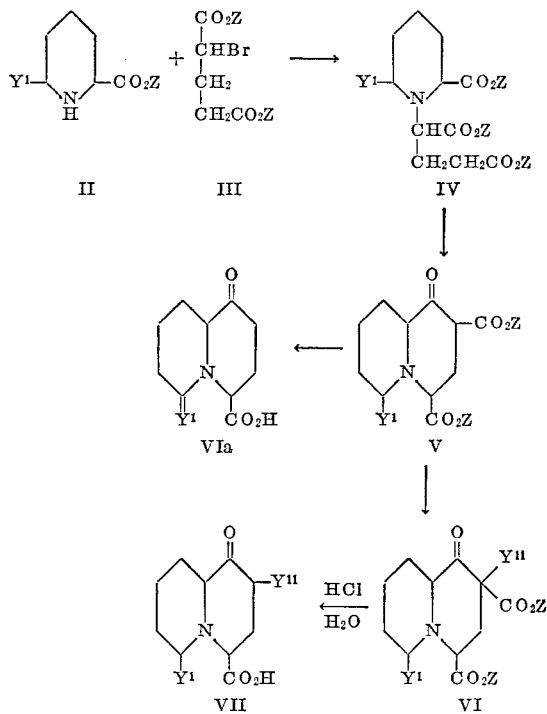

In accordance with one feature of the invention, alkyl pipecolates of Formula II are refluxed with dialkyl α-bromo glutarates of Formula III in an inert organic solvent in the presence of a basic catalyst to yield the dialkyl α-(2-alkoxycarbonyl)piperidinoglutarates (IV) which are novel intermediates of this invention.

The dialkyl α-(2-alkoxycarbonyl)piperidinoglutarate compounds (IV) are then treated with sodium hydride in an inert organic solvent to form the dialkyl 1-ketoquinolizidine-2,4-dicarboxylates of Formula V.

In accordance with a further feature of this invention, the dialkyl 1-ketoquinolizidine-2,4-dicarboxylate (V) are hydrolyzed with an acid to give the 1-ketoquinolizidine-4-carboxylic acid compounds of Formula VIa which are final products of this invention.

In accordance with a still further feature of this invention, the 1-ketoquinolizidine-2,4-dicarboxylates (V) may be treated with an alkyl halide in the presence of sodium hydride to yield the 2-alkyl-1-ketoquinolizidine-2,4-dicarboxylates of Formula VI.

The dicarboxylates of Formula VI may be hydrolyzed, such as with dilute hydrochloric acid, to yield the 2-alkyl-1-ketoquinolizidine-4-carboxylic acids of Formula VII, which are final products of this invention.

The following examples illustrate the invention (all temperatures being in centigrade):

EXAMPLE 1

Diethyl α-(2-ethoxycarbonyl)piperidinoglutarate

A 3 l. 3-necked flask was charged with granular potassium carbonate (230 gms.), triethylamine (1 ml.), and acetone (1000 ml.). Ethyl pipecolate (132 gms., 0.835 mole) was added and the mixture stirred and brought to reflux. A solution of diethyl α-bromo glutarate (223 gms., 0.835 mole) in 100 ml. of acetone was added to the refluxing suspension over a 4 hour period. Refluxed an additional 18 hours. Cooled and filtered off insolubles. The solvent was removed from the filtrate under vacuum and the residue poured into 500 ml. of ice-cold 2 N hydrochloric acid. The solution was decanted from an oil residue which was stirred with another 500 ml. of 2 N hydrochloric acid. This was combined with the original aqueous acid. The residue oil was dissolved in ether and the ether solution further extracted with 2 N acid. The aqueous acid solution was cooled, made basic with solid potassium carbonate, and extracted thoroughly with ether. The ether layer was washed with saline and dried over sodium sulfate. After filtering, the solvent was stripped and the residue distilled under vacuum. The product was collected at 165–168/0.6 mm. yielded 104 gms. (35.6%) of diethyl α-(2-ethoxycarbonyl)piperidinoglutarate.

Analysis.—Calcd. for $C_{17}H_{29}NO_6$: C, 59.45; H, 8.51; N, 4.08. Found: C, 59.27; H, 8.75; N, 3.82.

EXAMPLE 2

Diethyl α-(2-ethoxycarbonyl)pyrrolidinoglutarate

Following the procedure of Example 1, but substituting ethyl prolinate for ethyl pipecolate there is obtained diethyl α-(2-ethoxycarbonyl)pyrrolidinoglutarate.

EXAMPLE 3

Diethyl α-(2-ethoxycarbonyl-5-methyl)pyrrolidinoglutarate

Following the procedure of Example 1, but substituting ethyl 5-methyl-prolinate for ethyl pipecolate there is obtained diethyl α-(2-ethoxycarbonyl-5-methyl)pyrrolidinoglutarate.

EXAMPLE 4

Diethyl α-(2-ethoxycarbonyl-5-propyl)pyrrolidinoglutarate

Following the procedure of Example 1, but substituting ethyl 5-propyl-prolinate for ethyl pipecolate there is obtained diethyl (α-2-ethoxycarbonyl-5-propyl)pyrrolidinoglutarate.

EXAMPLE 5

Diethyl α-(2-ethoxycarbonyl-6-methyl)piperidinoglutarate

Following the procedure of Example 1, but substituting ethyl 6-methyl-pipecolate for ethyl-pipecolate there is obtained diethyl α-(2-ethoxycarbonyl-6-methyl)piperidinoglutarate.

EXAMPLE 6

Diethyl α-(2-ethoxycarbonyl-6-propyl)-piperidinoglutarate

Following the procedure of Example 1, but substituting ethyl 6-propyl-pipecolate for ethyl-pipecolate there is obtained diethyl α-(2-ethoxycarbonyl-6-propyl)piperidinoglutarate.

EXAMPLE 7

Diethyl 1-ketoquinolizidine-2,4-dicarboxylate

To a stirred suspension of sodium hydride (27.5 gm. of 55% dispersion in mineral oil, 0.6 mole) in 500 ml. of dry xylene, then slowly a solution of diethyl α-(ethoxycarbonyl)piperidinoglutarate (105 gms., 0.306 mole) in 100 ml. of xylene. The addition was made cautiously and the temperature slowly elevated by external heating to 100° C. After 30 minutes the evolution of hydrogen became vigorous and the reaction was exothermic. The heating mantle was quickly replaced by an ice-bath. After ten minutes the reaction moderated and heating was resumed for two hours. After cooling the xylene solution was stirred with dilute aqueous hydrochloric acid. The aqueous layer was removed and the xylene layer extracted several times with 2 N hydrochloric acid. The combined acid extracts was neutralized with sodium bicarbonate to a pH of 7–7.5. The oil was extracted into ether, washed with saline, and dried over sodium sulfate. Distillation afforded a yellow liquid, B.P. 144–45/.2 mm. yielded 70 gms. (78%) of diethyl 1-ketoquinolizidine-2,4-dicarboxylate.

*Analysis.*—Calcd. for $C_{15}H_{23}NO_5$: C, 60.59; H, 7.80; N, 4.71. Found: C, 60.42; H, 7.43; N, 4.37.

EXAMPLE 8

Diethyl 6-methyl-1-ketoquinolizidine-2,4-dicarboxylate

Following the procedure of Example 7, but substituting diethyl α-(2-ethoxycarbonyl-6-methyl)piperidinoglutarate for diethyl α-(2-ethoxycarbonyl)piperidinoglutarate there is obtained diethyl 6-methyl-1-ketoquinolizidine-2,4-dicarboxylate.

EXAMPLE 9

Diethyl 6-propyl-1-ketoquinolizidine-2,4-dicarboxylate

Following the procedure of Example 7, but substituting diethyl α-(2-ethoxycarbonyl-6-propyl)piperidinoglutarate for diethyl α-(2-ethoxycarbonyl)piperidinoglutarate there is obtained diethyl 6-propyl-1-ketoquinolidizine-2,4-dicarboxylate.

EXAMPLE 10

Diethyl 8-keto-octahydroindolizine-5,7-dicarboxylate

Following the procedure of Example 7, but substituting diethyl α-(2-ethoxycarbonyl)pyrrolidinoglutarate for diethyl α-(2-ethoxycarbonyl)piperidinoglutarate there is obtained diethyl 8-keto-octahydroindolizine-5,7-dicarboxylate.

EXAMPLE 11

Diethyl 3-methyl-8-keto-octahydroindolizine-5,7-dicarboxylate

Following the procedure of Example 7, but substituting diethyl α-(2-ethoxycarbonyl-5-methyl)pyrrolidinoglutarate for diethyl α-(2-ethoxycarbonyl)piperidinoglutarate there is obtained diethyl 3-methyl-8-keto-octahydroindolizine-5,7-dicarboxylate.

EXAMPLE 12

Diethyl 3-propyl-8-keto-octahydroindolizine-5,7-dicarboxylate

Following the procedure of Example 7, but substituting diethyl α-(2-ethoxycarbonyl-5-propyl)pyrrolidinoglutarate for diethyl α-(2-ethoxycarbonyl)piperidinoglutarate there is obtained diethyl 3-propyl-8-keto-octahydroindolizine-5,7-dicarboxylate.

EXAMPLE 13

1-ketoquinolizidine-4-carboxylic acid

A solution of 13 gms. (0.044 mole) of diethyl 1-ketoquinolizidine-2,4-dicarboxylate in 50 ml. of 18% hydrochloric acid was heated under reflux for 24 hours. After cooling the aqueous solution was taken to dryness under vacuum. The residue was triturated under ethanol and the product was filtered off, washed with ethanol and dried. M.P. 204–205° C. Yld. 3.2 gms. Concentrated filtrate to remove last traces of water, added ethanol, and cooled. A second crop of product obtained, M.P. 204–205° C. Total yield: 6.7 grams (65.2%) of 1-ketoquinolizidine-4-carboxylic acid.

*Analysis.*—Calcd. for $C_{10}H_{16}NO_3Cl$: C, 51.41; H, 6.91; N, 5.98; Cl, 15.17. Found: C, 51.18; H, 6.76; N, 5.92; Cl, 15.05.

EXAMPLE 14

6-methyl-1-ketoquinolizidine-4-carboxylic acid

Following the procedure of Example 13, but substituting diethyl-6-methyl-1-ketoquinolizidine 2,4-dicarboxylate for diethyl-1-ketoquinolizidine-2,4-carboxylate there is obtained 6-methyl-1-ketoquinolizidine-4-carboxylic acid.

EXAMPLE 15

6-propyl-1-ketoquinolizidine-4-carboxylic acid

Following the procedure of Example 13, but substituting diethyl-6-propyl-1-ketoquinolizidine 2,4-dicarboxylate for diethyl-1-ketoquinolizidine-2,4-carboxylate there is obtained 6-propyl-1-ketoquinolizidine-4-carboxylic acid.

EXAMPLE 16

8-keto-octahydroindolizine-5-carboxylic acid

Following the procedure of Example 13, but substituting diethyl-8-keto - octahydroindolizine-5,7-dicarboxylate for diethyl - 1 - ketoquinolizidine-2,4-carboxylate there is obtained 8-keto-octahydroindolizine-5-carboxylic acid.

EXAMPLE 17

3-methyl-8-keto-octahydroindolizine-5-carboxylic acid

Following the procedure of Example 13, but substituting diethyl 3-methyl-8-keto-octahydroindolizine-5,7-dicarboxylate for diethyl-1-ketoquinolizidine - 2,4 - carboxylate there is obtained 3-methyl-8-keto-octahydroindolizine-5-carboxylic acid.

EXAMPLE 18

3-propyl-8-keto-octahydroindolizine-5-carboxylic acid

Following the procedure of Example 13, but substituting diethyl-3-propyl-8-keto-octahydroindolizine-5,7-dicarboxylate for diethyl-1-ketoquinolizidine - 2,4 - carboxylate there is obtained 3-propyl-8-keto-octahydroindolizine-5-carboxylic acid.

What is claimed is:

1. A compound selected from the group consisting of those having the formula

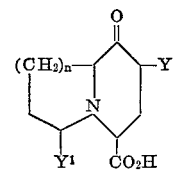

wherein $n$ is an integer either one or two; and Y and $Y^1$ are each selected from the group consisting of hydrogen and lower alkyl.

2. A compound as described in claim 1 which is: 1-ketoquinolizidine-4-carboxylic acid.

3. A compound as described in claim 1 which is: 6-methyl-1-ketoquinolizidine-4-carboxylic acid.

4. A compound as described in claim 1 which is: 6-propyl-1-ketoquinolizidine-4-carboxylic acid.

5. A compound as described in claim 1 which is: 8-ketooctahydroindolizine-5-carboxylic acid.

6. A compound as described in claim 1 which is: 3-methyl-8-ketooctahydroindolizine-5-carboxylic acid.

7. A compound as described in claim 1 which is: 3-propyl-8-ketooctahydroindolizine-5-carboxylic acid.

References Cited

Kunieda et al., Chem. Pharm. Bull. 15 (3), 337–44 (1967).

HENRY R. JILES, Primary Examiner

G. THOMAS TODD, Assistant Examiner

U.S. Cl. X.R.

260—294.3, 999